United States Patent
Zhang et al.

(10) Patent No.: US 8,329,320 B2
(45) Date of Patent: *Dec. 11, 2012

(54) LAMINATED HIGH MOMENT FILM FOR HEAD APPLICATIONS

(75) Inventors: Kunliang Zhang, Fremont, CA (US); Min Li, Dublin, CA (US); Min Zheng, Milpitas, CA (US); Fenglin Liu, Milpitas, CA (US); Xiaomin Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 338 days.

This patent is subject to a terminal disclaimer.

(21) Appl. No.: 12/291,715

(22) Filed: Nov. 13, 2008

(65) Prior Publication Data

US 2010/0119874 A1    May 13, 2010

(51) Int. Cl.
*G11B 5/31* (2006.01)
*G11B 5/127* (2006.01)

(52) U.S. Cl. ........ 428/812; 428/815; 360/324; 360/325; 360/125.01

(58) Field of Classification Search .................. None
See application file for complete search history.

(56) References Cited

U.S. PATENT DOCUMENTS

| | | | | |
|---|---|---|---|---|
| 3,867,368 A | * | 2/1975 | Lazzari | 360/125.33 |
| 4,610,935 A | * | 9/1986 | Kumasaka et al. | 428/632 |
| 4,748,089 A | * | 5/1988 | Kumasaka et al. | 428/635 |
| 5,132,859 A | * | 7/1992 | Andricacos et al. | 360/125.5 |
| 5,142,426 A | * | 8/1992 | Re et al. | 360/125.5 |
| 5,157,570 A | * | 10/1992 | Shukovsky et al. | 360/125.5 |
| 5,239,435 A | * | 8/1993 | Jeffers et al. | 360/125.5 |
| 5,264,981 A | * | 11/1993 | Campbell et al. | 360/125.45 |
| 5,313,356 A | * | 5/1994 | Ohkubo et al. | 360/125.5 |
| 5,576,098 A | * | 11/1996 | Arimoto et al. | 428/815.2 |
| 5,862,021 A | | 1/1999 | Deguchi et al. | |
| 6,259,583 B1 | * | 7/2001 | Fontana et al. | 360/125.5 |
| 6,452,763 B1 | | 9/2002 | Gill | |
| 6,778,358 B1 | * | 8/2004 | Jiang et al. | 360/125.5 |
| 6,822,829 B2 | * | 11/2004 | Minor et al. | 360/125.12 |

(Continued)

OTHER PUBLICATIONS

"High Moment Materials and Fabrication Processes for Shielded Perpendicular Write Head Beyond 200 Gb/in Sq.," by Chen et al., IEEE Transactions on Magnetics, vol. 43, No. 2, Feb. 2007, pp. 609-614.

(Continued)

*Primary Examiner* — Kevin Bernatz
(74) *Attorney, Agent, or Firm* — Saile Ackerman LLC; Stephen B. Ackerman

(57) ABSTRACT

A laminated high moment film with a non-AFC configuration is disclosed that can serve as a seed layer for a main pole layer or as the main pole layer itself in a PMR writer. The laminated film includes a plurality of (B/M) stacks where B is an alignment layer and M is a high moment layer. Adjacent (B/M) stacks are separated by an amorphous layer that breaks the magnetic coupling between adjacent high moment layers and reduces remanence in a hard axis direction while maintaining a high magnetic moment and achieving low values for Hch, Hce, and Hk. The amorphous material layer may be made of an oxide, nitride, or oxynitride of one or more of Hf, Zr, Ta, Al, Mg, Zn, Ti, Cr, Nb, or Si, or may be Hf, Zr, Ta, Nb, CoFeB, CoB, FeB, or CoZrNb. Alignment layers are FCC soft ferromagnetic materials or non-magnetic FCC materials.

15 Claims, 3 Drawing Sheets

U.S. PATENT DOCUMENTS

| | | | |
|---|---|---|---|
| 7,057,853 B2 | 6/2006 | Okada et al. | |
| 7,057,865 B1 | 6/2006 | Mao et al. | |
| 7,173,797 B2 | 2/2007 | Sbiaa | |
| 7,214,404 B2 | 5/2007 | Kim | |
| 7,280,314 B2* | 10/2007 | Gill et al. | 360/125.12 |
| 7,289,297 B1* | 10/2007 | Ewasko et al. | 360/125.12 |
| 7,294,418 B2* | 11/2007 | Ikeda et al. | 428/816 |
| 7,354,664 B1* | 4/2008 | Jiang et al. | 428/829 |
| 7,522,377 B1* | 4/2009 | Jiang et al. | 360/125.12 |
| 7,532,433 B2* | 5/2009 | Kawato et al. | 360/125.08 |
| 7,656,611 B2* | 2/2010 | Liu et al. | 360/125.12 |
| 7,672,080 B1* | 3/2010 | Tang et al. | 360/125.12 |
| 7,773,341 B2* | 8/2010 | Zhang et al. | 360/125.11 |
| 8,059,374 B2* | 11/2011 | Zhao et al. | 360/324.2 |
| 2002/0146580 A1 | 10/2002 | Wang et al. | |
| 2004/0240124 A1 | 12/2004 | Sbiaa | |
| 2006/0164764 A1* | 7/2006 | Kamiguchi et al. | 360/324.1 |
| 2007/0211391 A1 | 9/2007 | Hirata et al. | |
| 2009/0009907 A1* | 1/2009 | Zhang et al. | 360/125.12 |

OTHER PUBLICATIONS

"Single-Pole/TMR Heads for 140-Gb/in sq. Perpendicular Recording," by Nakamoto et al., IEEE Transactions on Magnetics, vol. 40, No. 1, Jan. 2004, pp. 290-294.

Optimization of high BsatFeCo films for write pole applications, by Mao et al., Journal of Appl. Physics 97, 10F908 (2005), American Institute of Physics, pp. 10F908-1 to 3.

Co-pending, U.S. Appl. No. 11/825,034, filed Jul. 3, 2007, "A Laminated Film for Head Applications," assigned to the same assignee as the present invention.

Co-pending, U.S. Appl. No. 11/820,962, filed Jun. 21, 2007, "PMR with Improved Writability and Process Controllability by Double Layer Patterning," assigned to the same assignee as the present invention.

* cited by examiner

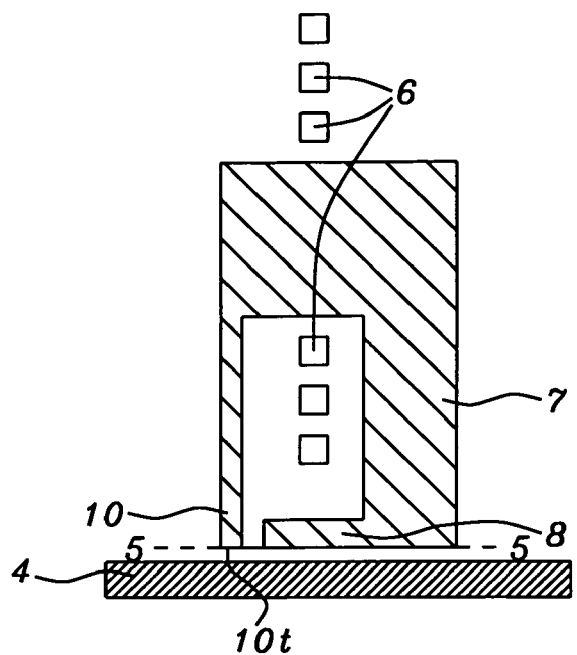
FIG. 1 – Prior Art
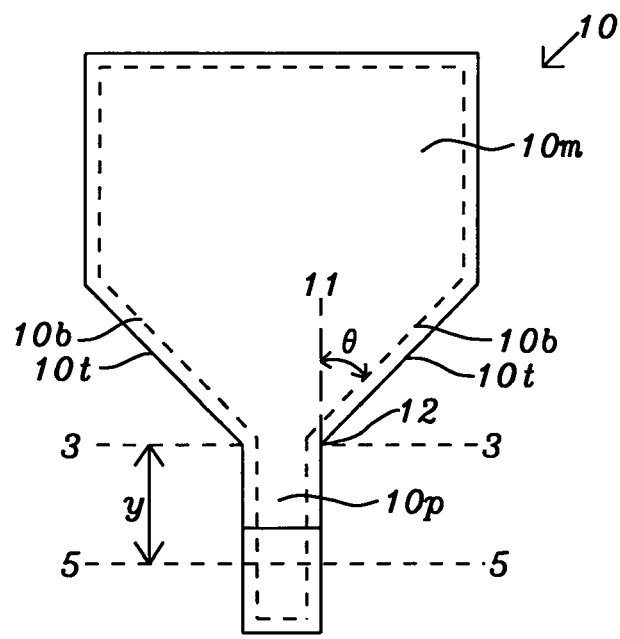
FIG. 2 – Prior Art

LAMINATED HIGH MOMENT FILM FOR HEAD APPLICATIONS

RELATED PATENT APPLICATIONS

This application is related to Headway Docket # HT07-005, Ser. No. 11/820,962, filing date Jun. 21, 2007; and HT07-013, Ser. No. 11/825,034, filing date Jul. 3, 2007; both assigned to the same assignee as the current invention and which are herein incorporated by reference in their entirety.

FIELD OF THE INVENTION

The invention relates to a laminated high moment film that may be used as a seed layer or a main pole layer in a PMR writer and a method for making the same wherein the laminated film has a plurality of alignment layers, a plurality of high moment FeCo layers, and at least one amorphous layer to improve high moment material softness and anisotropy field (Hk), and reduce remanence.

BACKGROUND OF THE INVENTION

Perpendicular magnetic recording (PMR) has become the mainstream technology for disk drive applications beyond 200 Gbit/in$^2$, replacing longitudinal magnetic recording (LMR) devices. Due to the continuing reduction of transducer size, high moment soft magnetic thin films with a Bs above 22 kG are required for write head applications. Although a PMR head which combines the features of a single pole writer and a soft magnetic underlayer has a great advantage over LMR in providing higher write field, better read back signal, and potentially much higher areal density, PMR still suffers some problems. One of the biggest issues is the head-induced data erasure that is of particular concern since the erasure occurs after writing. This type of erasure is believed to be caused by a remanent magnetization in the main pole layer.

A conventional PMR write head as depicted in FIG. 1 typically has a main pole layer 10 or write pole with a pole tip 10t at an air bearing surface (ABS) 5 and a flux return pole (opposing pole) 8 which is magnetically coupled to the write pole through a trailing shield 7. Magnetic flux in the write pole layer 10 is generated by coils 6 and passes through the pole tip into a magnetic recording media 4 and then back to the write head by entering the flux return pole 8. The write pole concentrates magnetic flux so that the magnetic field at the write pole tip 10t at the ABS is high enough to switch magnetizations in the recording media 4. A trailing shield is added to improve the field gradient in the down-track direction.

Referring to FIG. 2, a top view is shown of a typical main pole layer 10 that has a large, wide portion called a yoke 10m and a narrow rectangular portion 10p called a pole that extends a neck height (NH) distance y from the ABS plane 5-5 to a plane 3-3 parallel to the ABS where the pole intersects the yoke at the neck 12. The main pole layer 10 flares outward at an angle θ from a dashed line 11 that is an extension of one of the long rectangular sides of the pole 10p. PMR technologies require the pole 10p at the ABS to have a beveled shape (as viewed from the ABS) so that the skew related writing errors can be suppressed.

To achieve high areal recording density with PMR technology, key requirements for the PMR writer design are to provide large field magnitude and high field gradient in both down-track and cross-track directions. In practice, these two requirements are often traded off with each other to balance the overall performance. One approach involves optimizing the geometry of the main write pole such as modifying the values for NH and flare angle θ. A short NH or large θ can increase write field magnitude effectively. However, too short of a NH leads to problems of meeting process tolerance during manufacturing while too large of a flare angle θ may cause a large amount of adjacent track erasure because of a large fringe field. In today's commercial PMR writer products, NH is generally greater than 0.1 micron and flare angle θ is kept less than 45 degrees.

A trend in the industry is to increase the recording density and recording frequency which requires a higher saturation magnetic flux density ($B_S$) and higher resistivity (ρ) in the main pole layer than provided by conventional write heads. A low coercivity ($H_C$) is also desirable. A laminated high moment film involving an antiferromagnetic coupling scheme with Ru coupling layers between high moment layers has been described in U.S. Pat. No. 7,057,853 and by Y. Chen et al. in "High moment materials and fabrication processes for shielded perpendicular write head beyond 200 Gb/in$^2$", IEEE Trans. Magn. Vol. 43, No. 2, p 609 (2007). In the laminated scheme, a high moment material such as a FeCo layer is laminated into several thinner FeCo layers that are separated by non-magnetic layer insertions. When a non-magnetic lamination material such as Ru, Rh, or Cr reaches a certain thickness, a coupling energy is generated such that the magnetization of the FeCo layers on either side of a Ru or non-magnetic layer will align in anti-parallel directions thereby establishing an anti-ferromagnetic (AFC) laminated configuration. Since the magnetization in a FeCo layer is oriented opposite to that of the magnetic moment in the nearest FeCo layer, the remanent magnetization can be reduced. However, the AFC coupling strength of a FeCo/Ru/FeCo configuration is typically large and this type of AFC lamination will inevitably cause a large anisotropy field and low magnetic moment under a low field. Although the coupling strength can be lowered by using a thicker Ru of about 18 Angstrom compared with 7.5 Angstroms, the magnetic moment will be diluted as the non-magnetic content in the FeCo/Ru/FeCo stack is increased.

In non-AFC laminations where the lamination scheme does not involve AFC coupling, the reduction of remanent magnetization must be achieved through demagnetization fields. In this case, the FeCo layer is laminated with some non-magnetic material such as Cu or thick Ru. After patterning, the demagnetization fields will force the neighboring FeCo layers to form a closure-like domain structure to effectively reduce remanent magnetization. However, a thick Ru layer results in an undesirable decrease in magnetic moment for the main pole layer while a thicker Cu layer is typically required in order to effectively break the interlayer coupling between two neighboring FeCo layers sandwiched on either side of the Cu layer. Moreover, Cu is typically easy to corrode which is a disadvantage when considering reliability. Examples of non-AFC laminations are described by Min Mao et al. in "Optimization of high Bs FeCo film for write pole applications", JAP 97, 10F908 (2005), and by K. Nakamoto et al. in "Single pole/TMR heads for 140 Gb/in$^2$ perpendicular recording", IEEE Trans. Magn., Vol. 40, p 290 (2004). However, an improved non-AFC laminated film is needed that can function as a seed layer or a main pole layer while satisfying all the requirements of a main pole material including large magnetic moment, small coercivity in both easy axis and hard axis directions, small Hk, and small remanence.

Other related prior art includes the following references. In U.S. Pat. No. 7,214,404, a soft magnetic layer made of a NiFe alloy and at least one of Nb, V, Ta, Zr, Hf, Ti, B, Si, and P is used to reduce the demagnetization energy of an adjacent perpendicular magnetic recording layer in a PMR disk.

U.S. Pat. No. 6,452,763 discloses an inner pinned (AP1) layer with a laminated configuration in which FeCo layers are separated by nano oxide layers such as CoFeO.

U.S. Pat. No. 5,862,021 describes the use of a Co oxide film as a buffer layer below a pinned layer to weaken the magnetic coupling between the pinned layer and a free layer and thereby increase the MR ratio of a magnetoresistive element.

In U.S. Pat. No. 7,173,797, a composite inner pinned layer is employed to increase the MR ratio in a CPP type head and is comprised of a stack represented by FeCo/Cu/ferromagnetic layer/Cu/FeCo where the middle ferromagnetic layer is partially oxidized.

A composite free layer in U.S. Pat. No. 7,057,865 has a CoFe/Ru/CoFe configuration and is formed adjacent to a bias layer made of an antiferromagnetic material. The Ru spacer layer has an appropriate thickness to cause strong anti-parallel coupling in the CoFe free layers.

SUMMARY OF THE INVENTION

One objective of the present invention is to provide a laminated high moment film that can serve as a main pole layer or as a seed layer for a main pole layer, and having a high moment material softness, low Hk, and low remanence that minimizes pole erasure in PMR writer applications.

Another objective of the present invention is to provide a laminated high moment film according to the first objective while maintaining a high magnetic moment necessary for high areal density recording.

A third objective of the present invention is to provide a method for forming a laminated high moment film according to the first two objectives that is compatible with current manufacturing process flows and equipment and is cost effective.

These objectives are realized in the present invention by first providing a substrate upon which a mold forming layer has been formed. In one embodiment, an etch stop layer may be formed on the substrate followed by forming an insulation layer on the etch stop layer. A mold for the main pole layer is formed in the insulation layer by a sequence of photoresist imaging and etching steps. In one aspect, a photoresist layer is coated on the insulation layer and patternwise exposed to form an opening in the shape of a main pole layer with yoke and pole sections that uncovers a portion of the insulation layer. Thereafter, the opening is transferred through the insulation layer by a reactive ion etch (RIE) process that stops on the etch stop layer. Optionally, the mold formation sequence may include a first photoresist patterning and etching sequence followed by a second photoresist patterning and etching sequence to define different portions of the opening that correspond to different sections of the main pole layer.

After the photoresist layer is removed, a seed layer may be deposited on the insulation layer and on the etch stop layer within the mold shape. In a first embodiment, the seed layer may be the laminated high moment film of the present invention that has a laminated structure comprised of a thin amorphous material layer (A) such as an oxide or nitride and a high moment material layer (M) that is FeCo or FeCoNi. There is also an alignment layer (B) formed below each M layer that serves to align the magnetization and control the grain structure in the overlying high moment material layer. In a preferred embodiment represented by a $[(B/M)/A]_n/(B/M)$ configuration, n is an integer and an amorphous material layer (A) separates each (B/M) stack from a neighboring (B/M) stack. The amorphous material layer may be formed by first depositing an element (Hf) followed by a natural oxidation (NOX), radical oxidation (ROX), or plasma oxidation process to form HfOx, or by depositing HfOx in a sputter deposition process using an oxide target. Alternatively, the amorphous material layer may be comprised of ZrOx, TaOx, AlOx, MgOx, ZnOx, SiOx, TiOx, CrOx, NbOx, or one or more combinations of the aforementioned oxides. The present invention also encompasses an embodiment wherein the amorphous material layer is comprised of a nitride or an oxynitride of Hf, Zr, Ta, Al, Mg, Zn, Si, Ti, Cr, or Nb. The amorphous material layer is employed to break the exchange coupling between neighboring FeCo or FeCoNi layers so as to reduce the remanent magnetization in the seed layer.

In one aspect, the alignment layer (B) is comprised of NiFe. Alternatively, the B layer may be another face centered cubic (FCC) soft ferromagnetic material such as NiFeCo or an NiFe alloy with Hf, Ta, Cr, Zr, Nb, or Mg. In yet another embodiment, the B layer may be a thin non-magnetic FCC material such as NiCr, NiFeCr or alloys thereof.

Another embodiment is represented by B1/M/A/B2/M where B1 is an alignment layer made of a non-magnetic FCC material such as NiCr, NiFeCr, Ru, Rh, Ta, Cu, Pd, Hf, Cr, V, Ti, Mo or an alloy of two or more of the aforementioned metals, and B2 is an alignment layer made of NiFe or an alloy thereof.

In one embodiment, a main pole layer comprised of CoFe or CoFeNi, for example, is deposited on the uppermost M layer in the laminated high moment seed layer film. However, the present invention encompasses other embodiments wherein the laminated high moment film has sufficient thickness to serve both as a seed layer and the main pole layer.

After the laminated high moment film is formed as the main pole layer or the main pole layer is deposited on the laminated high moment seed layer film, one or more annealing processes such as hard axis annealing, easy axis annealing, or combinations of both hard axis and easy axis annealing may be employed. Then a planarization process such as a chemical mechanical polish (CMP) step may be performed to make the top surface of the main pole layer coplanar with the adjacent insulation layer.

BRIEF DESCRIPTION OF THE DRAWINGS

FIG. 1 is a cross-sectional view of a conventional PMR writer showing the main write pole, flux return pole, magnetic recording media, and coils that generate magnetic flux.

FIG. 2 is a top view showing a main write pole layer of a conventional PMR write head that has a narrow write pole section adjacent to the ABS and a larger yoke section with sides that flare outward at an angle θ from the sides of the narrow write pole.

DETAILED DESCRIPTION OF THE INVENTION

The present invention is a laminated high moment film formed as a seed layer or a main pole layer in a PMR writer and a method of making the same. Although a top view of the main pole layer is not shown, it should be understood that the yoke section of the main pole layer may have various shapes including a five sided structure as described in related patent application Ser. No. 11/820,962 which is herein incorporated by reference in its entirety. The present invention also anticipates a yoke shape for the seed layer and main pole layer that is essentially a continuous curved shape and one that has a plurality of sides as observed from a top (down-track) view.

Figure 3:
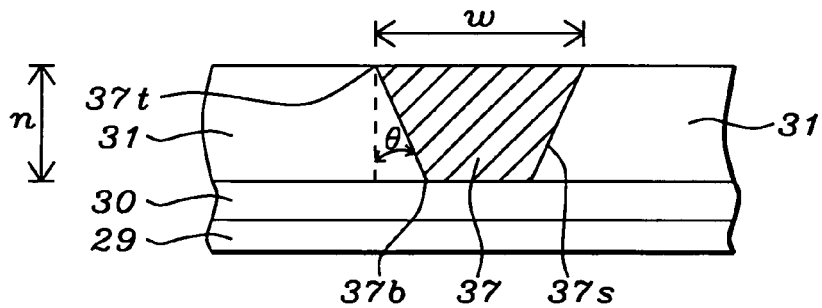
FIG. 3 is a cross-sectional view from an ABS plane of a laminated film formed within an insulation layer according to an embodiment of the present invention.

Referring to FIG. 3, a view of the write pole tip of a main pole layer 37 formed within an insulation layer 31 according to the present invention is seen from an ABS plane. In a preferred embodiment, the main pole layer 37 is comprised of a seed layer (not shown) as the bottom layer in the main pole layer structure. A substrate 29 is provided that may be comprised of AlTiC, for example. A RIE resistant layer 30 with a thickness of 200 to 1000 Angstroms may formed on the substrate 29 by a sputter deposition or physical vapor deposition (PVD) process, for example, and preferably includes a material such as Ru or NiCr that has a high selectivity relative to an insulating layer made of alumina or the like during a subsequent RIE etch that uses $BCl_3$, chlorine, and fluorocarbon gases. Alternatively, a RIE resistant layer may be omitted and the main pole layer 37 contacts a top surface of substrate 29. In the exemplary embodiment, an insulation layer 31 is formed on the RIE resistant layer 30 and within the insulation layer is an opening that is filled with a main pole layer structure 37. The insulation layer 31 may be comprised of $Al_2O_3$ or silicon oxide that is deposited by a PVD process, a sputtering technique, or the like in the same deposition tool as the RIE resistant layer. The insulation layer 31 may also be made of other dielectric materials known in the art and has a thickness equivalent to the desired thickness of the main pole layer 37.

The main pole layer 37 has a write pole section with sloped sidewalls 37s wherein the top surface 37t of the pole has a larger width along the ABS plane than the bottom surface 37b. Moreover, the sidewalls 37s are sloped at an angle θ of about 5 to 20 degrees with respect to the plane of the RIE resistant layer 30. The pole has a beveled shape with an angle θ so that the skew related writing errors can be suppressed.

A photoresist patterning and etching sequence for forming a mold in an insulation layer during a main pole layer fabrication has been previously described in related patent application Ser. No. 11/820,962 and involves a two mask process that provides an advantage of improving dimensional control of the pole by minimizing the effect of ABS positioning errors. In one embodiment, a first photoresist layer is patterned and etched to form a rectangular shape that corresponds to the write pole section of the main pole layer. The rectangular shape is transferred through the insulation layer by a RIE process comprising $BCl_3$, $Cl_2$, and a fluorocarbon gas to generate a trench with beveled sidewalls. Thereafter, the first photoresist layer is removed and a second photoresist layer is coated on the insulation layer and patterned to form a yoke shape opening that is partially superimposed over the rectangular trench. A second etch process involving $BCl_3$ and $Cl_2$ may be employed to transfer the yoke shape opening through the insulation layer and form essentially vertical sidewalls in the yoke section of the mold for the main pole layer.

Optionally, other double photoresist patterning and etching sequences or a single photoresist patterning and etch process may be used to form a mold in the insulation layer 31 for depositing the main pole layer 37. However, a technique is preferred that produces essentially vertical sidewalls in the yoke section of the mold and especially adjacent to the neck (not shown) in order to enable a maximum amount of magnetic material volume in the yoke proximate to the neck.

A method of forming the main pole layer will be described in a later section. First, various embodiments of incorporating a laminated high moment film within the main pole layer 37 according to the present invention will be described. All embodiments take advantage of a non-AFC scheme in which an amorphous material layer is inserted between two high moment layers in a plurality of stacks within the laminated high moment film to reduce remanence along a hard axis direction. Ideally, in a non-AFC lamination scheme, the main pole layer including a seed layer should have as large a magnetic moment as possible along the easy axis (Bse) and along the hard axis (Bsh) which means an amorphous material layer inserted between two high moment layers should be thin and yet able to reduce the magnetostatic coupling between neighboring high moment layers.

It is well known that to effectively break the coupling of a FeCo layer, the simplest scheme is to insert a non-magnetic amorphous and heavy element layer such as Ta or Hf. However, Ta, Hf, and similar elements easily diffuse into the FeCo layer during annealing, for example, and thereby cause a substantial reduction in the magnetic moment. Therefore, the inventors were motivated to discover other amorphous materials that can be inserted in a non-AFC lamination scheme without degrading magnetic moment but still minimizing remanence, Hc, and Hk. The following embodiments disclose various non-AFC schemes that fulfill all these requirements.

Although the exemplary embodiments show the laminated high moment film is formed on a RIE resistant layer 30, the advantages of the laminated high moment film of the present invention are not limited by the absence of a RIE resistant layer. For example, in one embodiment where a Ru layer serves as the bottom layer in the laminated high moment film, the Ru layer may function as a RIE resistant layer and also as part of the seed layer.

Figure 4:
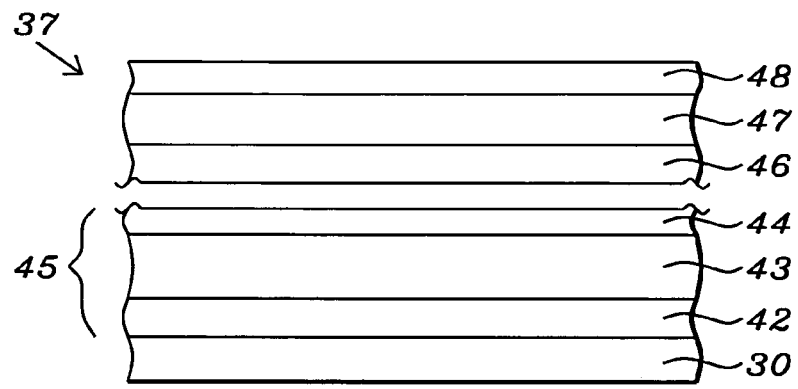
FIG. 4 is a cross-sectional view of a laminated high moment film having a $[(B/M)/A]_n/(B/M)/cap$ configuration that serves as a main pole layer according to one embodiment of the present invention.

Referring to FIG. 4, a first embodiment is depicted in which the laminated high moment film has sufficient thickness to serve as the main pole layer 37 and has a configuration represented by $[(B/M)/A]_n/(B/M)/cap$ where n is an integer, A is an amorphous material layer 44, M is a high moment magnetic material such as FeCo, FeCoNi, or alloys thereof that forms the M layers 43, 47, and B is a soft ferromagnetic face centered cubic (FCC) material or non-magnetic FCC material that forms the B layers 42, 46 and serves to control the grain growth and align the magnetic moment in overlying M layers 43, 47, respectively. Preferably, n is less than or equal to 7 in order to keep the plurality of (B/M) stacks at a size that is cost effective to manufacture. In other words, the present invention anticipates that n may be greater than 7 and provide substantially the same performance benefit as when n is between 1 and 7. However, the process flow when n>7 may not be desirable from a throughput perspective. When n is greater than 1, the stack 45 of BIM/A layers is repeated "n−1" times before the uppermost (B/M) stack represented by layers 46, 47 is formed on the uppermost A layer. Note that the plurality of (B/M) stacks and the A layers between adjacent (B/M) stacks are all aligned in a single column.

The cap layer 48 formed on the uppermost M layer may be comprised of Ru with a thickness of about 50 to 250 Angstroms and can serve as a CMP stop layer on the main pole layer stack. Alternatively, the cap layer 48 may be a composite made of two or more of Ru, Ta, MnPt, or other cap materials used in the art.

A seed layer (not shown) such as Ta/NiFe may be formed on the RIE resistant layer 30 by a sputter deposition process or PVD method to promote the deposition of overlying layers in the main pole layer 37. Preferably, the seed layer has a FCC or <1,1,1> crystal structure to provide smaller coercivity. In the exemplary embodiment, the seed layer is omitted and the B layer 42 in stack 45 that is formed on the RIE resistant layer 30 serves as a seed layer. The present invention also anticipates that the stack 45 formed on RIE resistant layer 30 may function as a composite seed layer.

Total thickness of the main pole layer 37 is typically about 2 microns but may be adjusted higher or lower to modify the performance of the PMR writer as appreciated by those skilled in the art. The M layers 43, 47 which comprise the largest portion of the main pole layer 37 have a thickness that is adjusted according to the desired thickness of the main pole layer. For example, when n=7 and the main pole layer 37 has a desired thickness of about 2 microns, each of the M layers 43 and the M layer 47 may have a thickness of about 250 Angstroms. In one aspect, the thickness of the B layers 42 remain constant from one stack 45 to the next stack 45 within a main pole layer 37 and the thickness of the M layers 43 remain constant from stack to stack. Likewise, the thickness of the A layers 44 may be substantially the same from stack to stack when n>1. However, the present invention also encompasses an embodiment wherein the thickness of one or more of the B, M, and A layers may vary from stack to stack within the main pole layer 37.

The B layers 42, 46 may be deposited by a sputter deposition technique and may be made of NiFe or FeCoNi with a thickness of 5 to 30 Angstroms as indicated in related patent application Ser. No. 11/825,034. In an alternative embodiment, one or more of the B layers 42, 46 may be comprised of another soft FCC ferromagnetic layer such as a NiFe alloy with one or more of Hf, Ta, Cr, Nb, Mg, Mo, V, and Zr having a 5 to 30 Angstrom thickness. In another embodiment, one or more of the B layers 42, 46 may be made of a non-magnetic FCC material such as NiCr, NiFeCr, and alloys thereof with a thickness of 5 to 10 Angstroms.

The high moment magnetic material M layers 43, 47 are preferably formed by a sputter deposition method in the same sputter deposition mainframe in which the A layer 44, cap layer 48, and B layers 42, 46 are deposited. For example, an Anelva sputter deposition system or the like that has a plurality of sputter deposition chambers and a least one oxidation chamber may be employed to deposit the A layer 44, M layers 43, 47, and the B layers 42, 46. Note that the trilayer stack 45 comprised of layers 42-44 may be repeated a plurality of times before the upper B/M stack comprised of layers 46-47 is deposited. Thereafter, the capping layer 48 is deposited on the uppermost M layer 47.

An amorphous material (A) layer 44 may be formed by first sputter depositing an element, preferably Hf, followed by a natural oxidation (NOX), radical oxidation (ROX), or plasma oxidation process in an oxidation chamber to form HfOx, or by depositing HfOx in a sputter deposition process using an oxide target. Alternatively, the amorphous material layer 44 may be comprised of ZrOx, TaOx, AlOx, MgOx, ZnOx, TiOx, CrOx, NbOx, or SiO$_2$, or one or more combinations of the aforementioned oxides. The amorphous material layer 44 is formed as the top layer in each stack 45 and has a thickness between 3 and 20 Angstroms, and preferably 7.5 Angstroms. There is an amorphous material layer 44 formed between each (B/M) stack in the laminated main pole layer 37 in order to break the exchange coupling between adjacent (B/M) stacks and thereby reduce the hard axis remanent magnetization (Brh) in the main pole layer. In an alternative embodiment, the amorphous material layer 44 may be comprised of Ta, Hf, Zr, Nb, CoFeB, CoB, FeB, CoZrNb, or alloys thereof with a thickness from 5 to 30 Angstroms.

The present invention also encompasses an embodiment wherein an amorphous material layer 44 is comprised of a nitride such as HfNx, ZrNx, TaNx, AlNx, MgNx, ZnNx, silicon nitride, or an oxynitride of Hf, Zr, Ta, Al, Mg, Zn, or Si. Furthermore, there may be an amorphous material layer 44 comprised of an oxide such as HfOx in one stack 45 and an amorphous material layer 44 made of a nitride such as HfNx in a different stack 45 within the main pole layer 37.

Figure 5:
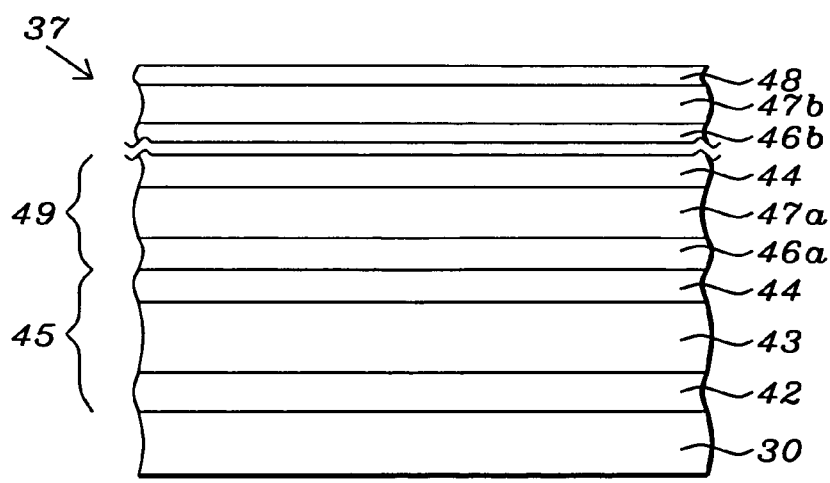
FIG. 5 is a cross-sectional view of a laminated high moment film with a $[(B1/M)/A]/(B2/M)_n$ configuration that serves as a main pole layer according to a second embodiment of the present invention.

Referring to FIG. 5, the present invention also encompasses an embodiment where the main pole layer 37 is a laminated stack represented by (B1/M/A)/[(B2/M)/A]$_n$/(B2/M)/cap where n is an integer, B1 is a first alignment layer made of Ru, NiCr, NiFeCr, Rh, Ta, Cu, Pd, Hf, Cr, V, Ti, Mo or alloys thereof having a thickness from 5 to 50 Angstroms, and B2 is a second alignment layer comprised of NiFeCo, NiFe or alloys thereof such as NiFeHf, NiFeTa, NiFeCr, NiFeZr, or NiFeNb with a thickness between 5 and 20 Angstroms. The B1 layer 42 serves as a transition layer between the RIE resistant layer 30 and the remaining layers in stack 45. There is only one stack 45 formed in the main pole layer 37 but there may be one or more stacks 49 formed on stack 45 wherein each stack 49 is comprised of a lower B2 layer 46a, a middle M layer 47a, and an upper A layer 44. The uppermost (B2/M) stack includes a B2 layer 46b and an M layer 47b. A cap layer 48 is preferably formed on M layer 47b to provide additional process control during a subsequent CMP step.

As mentioned previously, the thickness of an M layer is dependent on the desired thickness of the main pole layer 37 and the value of "n". In this embodiment, an amorphous material layer 44 is employed to break the exchange coupling between neighboring (B2/M) stacks or between stack 45 and the adjoining stack 49 and thereby reduce the hard axis remanent magnetization in the main pole layer. All of the B1, B2, M, and A layers are aligned in a single column as in the previous embodiment.

The process flow for forming a laminated main pole layer 37 within a mold in insulation layer 31 may be comprised of a series of sputter deposition processes to deposit the B layers (or B1, B2 layers), M layers, one or more A layers, and cap layer 48. In an embodiment wherein the A layer 44 is sputter deposited as an oxide, nitride, or oxynitride, all layers in the laminated main pole layer 37 may be sputter deposited within the same sputter deposition system. Optionally, the amorphous material layers 44 may be formed by a sputter deposition of an element such as Hf, Zr, Ta, Al, Mg, Zn, Cr, Nb, Ti, or Si in a sputter deposition chamber and then performing an oxidation step (ROX, NOX, or plasma oxidation) in an oxidation chamber within the same sputter deposition mainframe. After the cap layer 48 is laid down to complete the main pole layer stack, a CMP process may be employed to planarize the laminated main pole layer 37 so that the top surface of the laminated main pole layer is coplanar with the top surface of insulation layer 31. It should be understood that a portion of the cap layer 48 may be removed during the CMP step.

Figure 6:
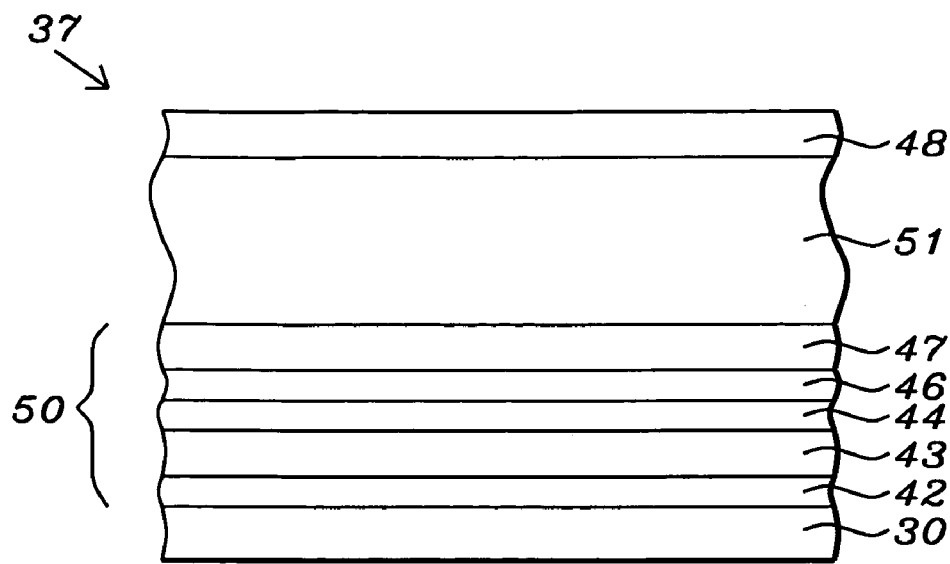
FIG. 6 is a cross-sectional view of a laminated high moment film with a (B/M/A/B/M) or (B1/M/A/B2/M) configuration that serves as a seed layer for a main pole layer according to a third embodiment of the present invention

Referring to FIG. 6, another embodiment of the present invention is depicted wherein a laminated high moment film serves as a seed layer 50 in a main pole layer structure 37. In one aspect, the seed layer 50 has a (B/M/A/B/M) configuration and a high moment layer 51 such as CoFe or CoFeNi, formed between upper M layer 47 and cap layer 48, comprises a substantial portion of the main pole layer structure 37. The lower B layer 42 that contacts RIE resistant layer 30 may serve as a seed layer. Above the lower B layer 42 is sequentially formed a first M layer 43, an A layer 44, a second B layer 46, and a second M layer 47. Preferably, the M layers 43, 47 comprise a major portion of the seed layer 50. The B layers 42, 46 in seed layer 50 may be made of NiFe, FeCoNi, or alloys thereof with a thickness of 5 to 30 Angstroms or may be comprised of another soft FCC ferromagnetic layer such as a NiFe alloy with one or more of Hf, Ta, Cr, Nb, Mg, Mo, V, and Zr having a thickness of 5 to 30 Angstroms. Alternatively, one or more of the B layers 42, 46 may be made of a non-magnetic FCC material such as NiCr, NiFeCr, and alloys thereof with a thickness of 5 to 10 Angstroms.

The A layer 44 in seed layer 50 may be comprised of ZrOx, TaOx, AlOx, MgOx, ZnOx, TiOx, CrOx, NbOx, or $SiO_2$, or one or more combinations of the aforementioned oxides and has a thickness between 3 and 20 Angstroms, and preferably 7.5 Angstroms. In another aspect, the A layer 44 may be a nitride or oxynitride of one or more of Zr, Ta, Al, Mg, Zn, Ti, Cr, Nb, and Si. Optionally, the A layer 44 may be comprised of Ta, Hf, Zr, Nb, CoFeB, CoB, FeB, CoZrNb, or alloys thereof with a thickness from 5 to 30 Angstroms. The A layer is employed to reduce the grain size in overlying layers and to break exchange coupling between M layers 43, 47 and thereby reduce the remanent magnetization after the main pole layer is patterned and annealed.

In an alternative embodiment, the seed layer 50 may have a (B1/M/A/B2/M) configuration wherein the B1 layer 42 and B2 layer 46 have a composition as described previously. For example, B1 layer 42 may be Ru, NiCr, NiFeCr, Rh, Ta, Cu, Pd, Hf, Cr, V, Ti, or Mo, or alloys thereof with a thickness between 5 and 50 Angstroms. The B2 layer 46 may be comprised of NiFe or other soft ferromagnetic materials such as NiFeCo or NiFe alloys with Hf, Ta, Zr, Cr, and Nb with a thickness from 5 to 30 Angstroms, or may be made of NiCr, NiFeCr, or alloys thereof with a thickness from 5 to 10 Angstroms. Preferably, the Ni content in the NiFe and NiFe alloy layers is between 50 and 95 atomic % while the third metal used in a ternary NiFe alloy is kept below about 5 atomic % so that the magnetic moment does not significantly decrease. The B1 and B2 layers 42, 46 function as alignment layers for the magnetization direction in overlying M layers 43, 47, respectively.

COMPARATIVE EXAMPLE 1

Figure 7:
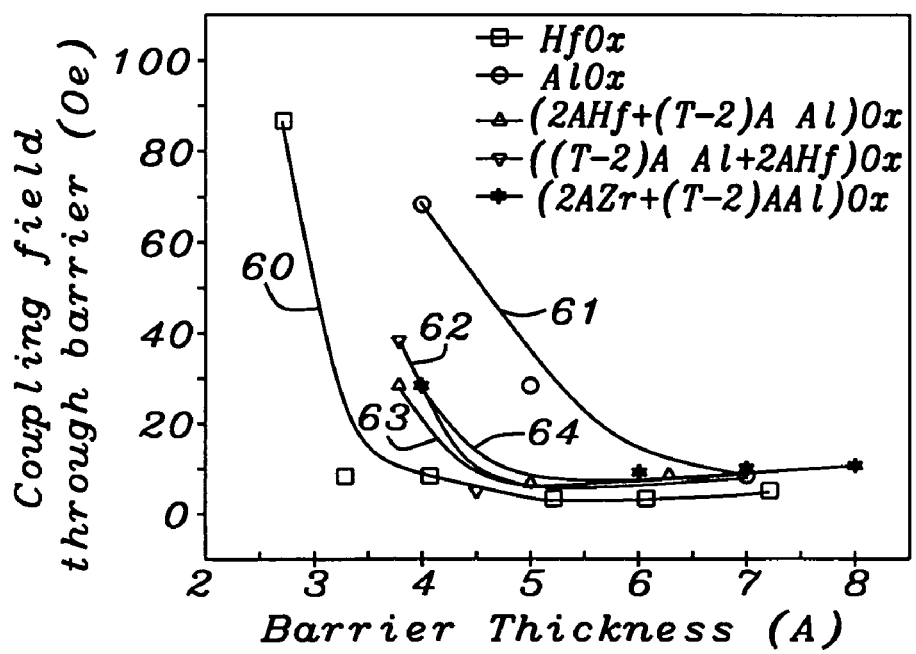
FIG. 7 is a plot that shows a coupling field through different amorphous barrier layers as a function of barrier layer thickness.

An experiment was performed to determine the relative effectiveness of various amorphous material layers in reducing the coupling field between neighboring high moment layers. In this case, a seed layer (Ta20/NiFe10) was formed on an AlTiC substrate followed by sequential formation of a first high moment layer (FeCo250), an amorphous material layer, a second high moment layer (FeCo250), and a cap layer (Ru150). Measurements were performed using a BH looper instrument. Results are depicted in FIG. 7. An amorphous material layer comprised of HfOx (curve 60) was found to provide the best results in terms of minimizing the coupling field with a thickness as low as 4 Angstroms. An amorphous material layer made of AlOx (curve 61) must be nearly twice as thick as that of HfOx to achieve the same reduction in coupling field. Composite amorphous material layers represented by AlOx/HfOx (curve 62), HfOx/AlOx (curve 63), and ZrOx/AlOx (curve 64) provide improved performance over a single layer of AlOx but are not as effective as a single layer of HfOx. Oxide layers were formed by first sputter depositing a metal layer (Hf, Zr, or Al) followed by an NOX oxidation. Composite amorphous material layer 62 was fabricated by first forming an AlOx layer by NOX oxidation of an Al layer having a (T-2) Angstrom thickness on the first FeCo layer where T is the thickness along the x-axis (FIG. 7) and then forming a HfOx layer by NOX oxidation of a Hf layer having a thickness of 2 Angstroms on the AlOx layer. Likewise, a HfOx/AlOx configuration was produced by first forming a HfOx layer (by NOX) of a 2 Angstrom thick Hf layer on the first FeCo layer and then forming an AlOx layer by NOX oxidation of a (T-2) Angstrom thickness of Al on the HfOx layer.

COMPARATIVE EXAMPLE 2

In a second experiment, a laminated high moment film according to an embodiment of the present invention was formed on an aluminum oxide substrate. The laminated structure is represented by a NiFe10/FeCo350/HfOx7.5/NiFe10/FeCo350 configuration where the number following the composition is the thickness in Angstroms of the layer. In this example, NiFe layers with a Ni content of 90 atomic % serve as the B layers, FeCo with a Fe content of 70 atomic % are the M layers, and HfOx is the A layer in an embodiment previously described as $[(B/M)/A]_n(B/M)$ where n=1, or alternatively as B/M/A/B/M. The lower NiFe layer serves as a seed layer and an alignment layer for the overlying FeCo and thereby controls the FeCo grain growth and grain size. The amorphous HfOx layer is inserted between the two B/M (NiFe/FeCo) layers to reduce grain size and to break exchange coupling between the two (B/M) stacks. For comparison, a single film of FeCo having a 700 Angstrom thickness was also tested.

Table 1 shows the comparison of magnetic properties between a single 700 Angstrom FeCo film and a laminated film of the present invention. Clearly, the intended objectives of a high moment film with excellent softness in easy and hard axis directions as well as small hard axis remanence (Brh) and small coercivity (Hce, Hch) has been achieved. We have measured the magnetic moment of the laminated film in Table 1 to be as high as 23.3 KG. The laminated structure of the present invention retains the high magnetic moments (Bse, Bsh) in the easy axis and hard axis directions, respectively, that is typically observed for a prior art FeCo main pole layer while yielding the desired substantial reduction in coercivity (Hce, Hch) in the easy axis and hard axis directions, respectively, as well as a large reduction in Hk and in remanence along the hard axis direction (Brh). The results shown in Table 1 were obtained before annealing.

TABLE 1

Comparison of magnetic properties between a single FeCo layer and a laminated film formed on an AlOx substrate and with a Ru cap layer 50 Angstroms thick

| Configuration | Bse (nW) | Bre (nW) | Hce (Oe) | Bsh (nW) | Brh (nW) | Hk (Oe) | Hch (Oe) |
|---|---|---|---|---|---|---|---|
| FeCo700A (no seed, isotropic) | 15.38 | 14.14 | 71.4 | | | | |
| [NiFe10/FeCo350/ HfOx7.5/NiFe10/ FeCo350 | 16.2 | 14.53 | 4.8 | 15.1 | 0.9 | 18.4 | 0.9 |

COMPARATIVE EXAMPLE 3

In a third experiment, a laminated high moment film according to an embodiment of the present invention was formed on an aluminum oxide substrate. The laminated structure is represented by a Ru20/FeCo350/HfOx7.5/NiFe10/FeCo350 configuration where the number following the composition is the thickness in Angstroms of the layer (row 3 in Table 2). In this example, a Ru layer serves as a B1 layer, FeCo with a Fe content of 70 atomic % are the two M layers, HfOx is the A layer, and NiFe with a Ni content of 90 atomic % is the B2 layer in an embodiment previously described as a B1/M/A/B2/M seed layer. The Ru layer serves as an alignment layer for the overlying FeCo and thereby controls the FeCo grain growth and grain size. The amorphous HfOx layer is inserted between the (B1/M) and (B2/M) layers to reduce grain size and to break exchange coupling between the B1/M and B2/M stacks. For comparison, a single film of FeCo having a 700 Angstrom thickness was tested with no seed layer and on a 20 Angstrom thick Ru layer. A Ru cap layer is used as the uppermost layer for probing the film.

TABLE 2

Comparison of magnetic properties between a single CoFe film and a laminated film formed on an AlOx substrate and with a Ru cap layer

| Configuration | Bse (nW) | Bre (nW) | Hce (Oe) | Bsh (nW) | Brh (nW) | Hk (Oe) | Hch (Oe) |
|---|---|---|---|---|---|---|---|
| FeCo700 (no seed, iostropic) | 15.38 | 14.14 | 71.4 | | | | |
| Ru20/FeCo700 | 16.12 | 14.67 | 19 | 15.34 | 13.77 | 19 | 7.45 |
| Ru20/FeCo350/ HfOx7.5/NiFe10/ FeCo350 | 16.15 | 14.97 | 5.5 | 13.61 | 0.86 | 19 | 1.25 |

The laminated film in the bottom row of Table 2 was found to have a magnetic moment as high as 23.4 KG. Thus, the inventors have demonstrated a non-AFC lamination scheme as described herein can achieve a high moment and excellent softness in easy axis (Hce) and hard axis (Hch) directions while exhibiting low remanence (Brh) along the hard axis. These properties are independent of the laminated film thickness. Thus, the laminated high moment film of the present invention may function as a seed layer or as a main pole layer and significantly improve main pole layer performance in a PMR writer. The present invention also allows much flexibility in the design as the number and thickness of the laminated layers may be modified in the various embodiments to optimize performance. For example, the laminated high moment film may be comprised of a B/M/A/B/M stack or a B1/M/A/B2/M stack of layers and function as a seed layer portion of a main pole layer, or may be comprised of a [(B/M)/A]$_n$(B/M) or (B1/M/A)/[(B2/M)/A]$_n$(B2/M) stack and serve as the main pole layer itself. A method for forming the laminated high moment film has been described which can be readily implemented in existing manufacturing lines since all the steps may be performed within the same sputter deposition mainframe.

While this invention has been particularly shown and described with reference to, the preferred embodiment thereof, it will be understood by those skilled in the art that various changes in form and details may be made without departing from the spirit and scope of this invention.

We claim:
1. A laminated magnetic film formed on a top surface of a substrate, comprising:
   (a) a plurality of (B/M) stacks each comprised of an alignment layer (B) that consists of NiCr or consists of a NiFe alloy with Hf, Ta, Zr, Nb, Mg, Mo, or V for controlling the grain growth and magnetic moment direction in an overlying magnetic layer, and a magnetic layer (M) having a higher moment than said alignment layer and wherein the stacks are aligned in a single column perpendicular to the top surface of the substrate and each of the plurality of (B/M) stacks has a bottom surface and a top surface;
   (b) one or more amorphous material layers (A) made of CoFeB, CoB, or FeB formed between the top surface of a (B/M) stack and a bottom surface of an overlying (B/M) stack such that none of the (B/M) stacks contact each other; and
   (c) a cap layer formed on the top surface of an uppermost (B/M) stack to give a configuration represented by [(B/M)/A]$_n$/(B/M)/cap where n is an integer.

2. The laminated magnetic film of claim 1 wherein the alignment layer is a face centered cubic (FCC) ferromagnetic material that consists of a NiFe alloy of Hf, Ta, Zr, Nb, Mg, Mo, or V with a thickness between about 5 and 30 Angstroms.

3. The laminated magnetic film of claim 1 wherein the alignment layer consists of NiCr with a thickness from about 5 to 10 Angstroms.

4. The laminated magnetic film of claim 1 wherein the magnetic (M) layers are comprised of FeCo, FeCoNi, or alloys thereof.

5. The laminated magnetic film of claim 1 wherein the amorphous material layer has a thickness from about 5 to 30 Angstroms.

6. A laminated magnetic film formed on a top surface of a substrate, comprising:
   (a) a first stack of layers, comprising:
      (1) a first alignment layer (B1) formed on the top surface of said substrate for controlling the grain growth and magnetic moment direction in an overlying magnetic layer;
      (2) a magnetic layer (M) formed on the first alignment layer and having a higher moment than said first alignment layer; and
      (3) a first amorphous layer (A) made of CoFeB, CoB, or FeB—or alloys thereof formed on the magnetic layer;
   (b) a plurality of (B2/M) stacks formed on the first amorphous layer wherein each of said plurality of (B2/M) stacks is comprised of a lower second alignment layer (B2) that consists of NiCr or consists of a NiFe alloy with Hf, Ta, Zr, Nb, Mg, Mo, or V for controlling the grain growth and magnetic moment direction in an overlying magnetic (M) layer, and upper magnetic layer (M) such that each of the (B2/M) stacks has a bottom surface and a top surface and is stacked in a direction perpendicular to the top surface of the substrate;
   (c) an amorphous material layer (A) made of CoB, FeB, CoFeB, or an alloy thereof that is formed between the top surface of a (B2/M) stack and the bottom surface of an overlying (B2/M) stack; and
   (d) a cap layer formed on the top surface of an uppermost (B2/M) stack to give a configuration represented by (B1/M/A)/[(B2/M)/A]$_n$/(B2/M)/cap where n is an integer and all the layers in said laminated magnetic film are aligned to form a single column.

7. The laminated magnetic film of claim 6 wherein the first alignment layer consists of NiCr or consists of Ru, Rh, Ta, Cu, Pd, Hf, Cr, V, Ti, Mo or alloys thereof and has a thickness from about 5 to 50 Angstroms.

8. The laminated magnetic film of claim 6 wherein the magnetic (M) layers in the (B1/M) and (B2/M) stacks are comprised of FeCo, FeCoNi, or alloys thereof.

9. The laminated magnetic film of claim 6 wherein the amorphous material layer formed in the first stack of layers and between adjacent (B2/M) stacks has a thickness from about 5 to 30 Angstroms.

10. The laminated magnetic film of claim 6 wherein the second alignment layer formed in the (B2/M) stacks of layers consists of NiFeHf, NiFeTa, NiFeZr, NiFeNb, or other NiFe alloys with Mg, Mo, or V having a thickness between about 5 and 20 Angstroms.

11. A laminated magnetic film formed on a top surface of a substrate, comprising:
    (a) a first alignment layer having a top surface, said first alignment layer consists of NiCr or consists of a NiFe alloy with Hf, Ta, Zr, Nb, Mg, Mo, or V and contacts the top surface of the substrate;
    (b) a first magnetic layer contacting said first alignment layer and having a higher moment than said first alignment layer;
    (c) an amorphous material layer made of CoFeB, CoB, FeB, or an alloy thereof that is formed on the first magnetic layer;
    (d) a second alignment layer that consists of NiCr, or a NiFe alloy with Hf, Ta, Zr, Nb, Mg, Mo, or formed on the amorphous layer; and
    (e) a second magnetic layer formed on the second alignment layer the second magnetic layer having a higher moment than the second alignment layer.

12. The laminated magnetic film of claim 11 wherein the first alignment layer has a thickness from about 5 to 50 Angstroms.

13. The laminated magnetic film of claim 11 wherein the second alignment layer consists of NiFeHf, NiFeTa, NiFeZr, NiFeNb, or other NiFe alloys with Mg, Mo, or V, and having a thickness between about 5 and 20 Angstroms.

14. The laminated magnetic film of claim 11 wherein the first and second high moment magnetic layers are comprised of FeCo, FeCoNi, or alloys thereof.

15. The laminated magnetic film of claim 11 wherein the amorphous material layer has a thickness from about 5 to 30 Angstroms.

* * * * *